(12) United States Patent
Jellison, Jr. et al.

(10) Patent No.: US 11,810,570 B2
(45) Date of Patent: Nov. 7, 2023

(54) GRAPHICAL USER INTERFACE DISPLAYING LINKED SCHEDULE ITEMS

(71) Applicant: iHeartMedia Management Services, Inc., San Antonio, TX (US)

(72) Inventors: David C. Jellison, Jr., Ogallala, NE (US); Philippe Generali, Scarsdale, NY (US)

(73) Assignee: IHEARTMEDIA MANAGEMENT SERVICES, INC., San Antonio, TX (US)

( * ) Notice: Subject to any disclaimer, the term of this patent is extended or adjusted under 35 U.S.C. 154(b) by 114 days.

(21) Appl. No.: 17/349,541

(22) Filed: Jun. 16, 2021

(65) Prior Publication Data

US 2021/0312925 A1    Oct. 7, 2021

Related U.S. Application Data

(63) Continuation of application No. 15/948,668, filed on Apr. 9, 2018, now Pat. No. 11,043,221.

(60) Provisional application No. 62/489,340, filed on Apr. 24, 2017.

(51) Int. Cl.
*G10L 15/26*      (2006.01)
*G10L 25/51*      (2013.01)
*G06F 16/683*     (2019.01)

(52) U.S. Cl.
CPC ............ *G10L 15/26* (2013.01); *G06F 16/683* (2019.01); *G10L 25/51* (2013.01)

(58) Field of Classification Search
CPC ....... G10L 15/26; G10L 15/22; G10L 15/265; G06F 16/683; G06F 16/685
See application file for complete search history.

(56) References Cited

U.S. PATENT DOCUMENTS

| | | | |
|---|---|---|---|
| 7,047,191 B2 | 5/2006 | Lange | |
| 7,349,663 B1 * | 3/2008 | Joseph | H04L 65/611 709/224 |
| 9,129,021 B2 | 9/2015 | Steelberg | |
| 9,224,385 B1 * | 12/2015 | Sharifi | G10L 15/26 |
| 9,461,958 B1 * | 10/2016 | Green | H04L 65/612 |
| 9,633,696 B1 * | 4/2017 | Miller | G11B 27/031 |
| 10,482,168 B2 * | 11/2019 | McKoen | G06F 40/169 |

(Continued)

*Primary Examiner* — Mark Villena
(74) *Attorney, Agent, or Firm* — Harness, Dickey & Pierce, P.L.C.

(57) ABSTRACT

A first speech audio file scheduled for transmission in a first position of a transmission schedule, a first transcript of the first speech audio file, and first metadata associated with a first content item scheduled for transmission in a second position of the transmission schedule are obtained. The first metadata is compared to at least a portion of the first transcript to determine whether any of the first metadata matches the at least a portion of the first transcript. In response to determining that at least a portion of the first metadata matches at least a portion of the first transcript, linkages are created between the first speech audio file and the first content item. A graphical user interface (GUI) is generated, and displays a list of items scheduled for transmission including: a first identifier representing the first speech audio file in the first position; and a second identifier representing the first content item in the second position.

20 Claims, 6 Drawing Sheets

(56) References Cited

U.S. PATENT DOCUMENTS

| | | | |
|---|---|---|---|
| 2002/0063783 A1* | 5/2002 | Kurase | H04N 5/772 386/E5.072 |
| 2007/0261534 A1* | 11/2007 | Allen | G10H 1/365 704/E21.02 |
| 2008/0109845 A1* | 5/2008 | Hengel | G06Q 30/02 725/36 |
| 2008/0140702 A1* | 6/2008 | Reed | G06F 16/40 707/999.102 |
| 2008/0318529 A1* | 12/2008 | Harb | H04H 60/82 455/66.1 |
| 2009/0307199 A1* | 12/2009 | Goodwin | G06F 16/4387 |
| 2010/0268360 A1* | 10/2010 | Ingrassia | H04H 20/106 707/E17.001 |
| 2011/0004669 A1* | 1/2011 | Navar | G06F 21/10 709/217 |
| 2012/0029918 A1 | 2/2012 | Bachtiger | |
| 2012/0296978 A1* | 11/2012 | Inoue | G06F 16/00 709/204 |
| 2013/0006629 A1* | 1/2013 | Honda | G10L 15/187 704/E15.001 |
| 2013/0090752 A1* | 4/2013 | Jellison, Jr. | H04L 65/61 700/94 |
| 2013/0138438 A1 | 5/2013 | Bachtiger | |
| 2013/0290818 A1* | 10/2013 | Arrasvuori | H04N 21/4383 715/201 |
| 2013/0311181 A1 | 11/2013 | Bachtiger | |
| 2014/0163980 A1* | 6/2014 | Tesch | G10L 25/57 704/235 |
| 2014/0198174 A1* | 7/2014 | Sanso | H04N 7/15 704/235 |
| 2014/0214917 A1* | 7/2014 | Jellison, Jr. | H04H 40/09 709/202 |
| 2014/0358267 A1* | 12/2014 | Littlejohn | G06Q 30/02 700/94 |
| 2015/0039991 A1* | 2/2015 | Cameron | G11B 27/34 715/230 |
| 2015/0100142 A1* | 4/2015 | Alders | H04L 67/10 700/94 |
| 2015/0199968 A1* | 7/2015 | Singhal | H04N 21/812 704/251 |
| 2015/0341408 A1* | 11/2015 | Jellison, Jr. | H04H 20/103 709/231 |
| 2015/0379209 A1* | 12/2015 | Kusuma | H04L 67/60 705/3 |
| 2015/0382047 A1* | 12/2015 | Van Os | H04N 21/4316 725/38 |
| 2016/0004773 A1 | 1/2016 | Jannink | |
| 2016/0104196 A1 | 4/2016 | Steelberg | |
| 2016/0189712 A1 | 6/2016 | Steelberg | |
| 2016/0337059 A1* | 11/2016 | Nehls | H04H 60/06 |
| 2017/0024760 A1 | 1/2017 | Steelberg | |
| 2017/0032483 A1 | 2/2017 | Steelberg | |
| 2017/0053323 A1 | 2/2017 | Steelberg | |
| 2017/0085696 A1* | 3/2017 | Abkairov | G06F 3/04883 |
| 2017/0115955 A1* | 4/2017 | Zalon | G06F 3/16 |
| 2017/0147576 A1* | 5/2017 | Des Jardins | G06Q 30/0256 |
| 2017/0169814 A1* | 6/2017 | Pashine | G10L 15/06 |
| 2017/0169827 A1* | 6/2017 | Barreira Avegliano | H04N 21/4394 |
| 2017/0195398 A1* | 7/2017 | Sharma | H04N 21/44224 |
| 2017/0195700 A1* | 7/2017 | Jin | H04N 21/44008 |
| 2017/0289598 A1* | 10/2017 | Labsky | H04N 21/25891 |
| 2018/0157745 A1* | 6/2018 | Williams | G06F 16/639 |
| 2019/0261053 A1* | 8/2019 | Burkart | H04N 21/44204 |

* cited by examiner

GRAPHICAL USER INTERFACE DISPLAYING LINKED SCHEDULE ITEMS

CROSS REFERENCES TO RELATED APPLICATIONS

The present U.S. Utility Patent application claims priority pursuant to 35 U.S.C. § 120 as a continuation of U.S. Utility application Ser. No. 15/948,668, entitled "TRANSMISSION SCHEDULE ANALYSIS AND DISPLAY," filed Apr. 9, 2018, scheduled to issue as U.S. Pat. No. 11,043,221 on Jun. 22, 2021, which claims priority pursuant to 35 U.S.C. § 119(e) to U.S. Provisional Application No. 62/489,340, entitled "TRANSMISSION SCHEDULE ANALYSIS AND DISPLAY," filed Apr. 24, 2017, both of which are hereby incorporated herein by reference in their entirety and made part of the present U.S. Utility Patent Application for all purposes.

FIELD

The present disclosure relates to systems and methods of analyzing and displaying a transmission schedule.

BACKGROUND

A transmission schedule for play out of media content may include a prerecorded voice track corresponding to speech of an announcer. The pre-recorded voice track may refer to other media content that is scheduled for transmission. The transmission schedule and the pre-recorded voice track may be generated in advance of the scheduled transmission time. A user (e.g., a supervisor) may have to listen to the voice track ahead of the transmission time to audit the speech content of the voice track. Listening to each voice track included in a transmission schedule for multiple days may be time-consuming and inconvenient for the user. In addition, if the transmission schedule has to be updated prior to transmission, a user may have to listen to the voice track before removing other media content from the transmission schedule to check whether the speech content of the voice track refers to the other media content.

SUMMARY

Systems and methods of analyzing and displaying a transmission schedule are disclosed. In a particular implementation, a content manager system converts a voice track (e.g., a speech audio file (SAF)) to text. The content manager system may determine whether at least a portion of the text matches at least a portion of metadata of a content item indicated by the transmission schedule. The content manager system creates a data record indicating that the SAF refers to the content item in response to detecting a match. The data record may indicate that deletion of the content item is restricted. Consequently, a likelihood of inadvertently deleting the content item while the SAF refers to the content item may be reduced. The content manager system may also provide an indication that the SAF refers to the content item in the display. The content manager system may provide the text to a display for analysis by a user. In some implementations, the text is editable by the user, and the content manager system updates the SAF in response to receiving edits to the text.

In a particular aspect, a method includes generating, at a device, text based on speech content of an audio file that is identified in a transmission schedule. The method also includes comparing, at the device, the text to metadata of a content item identified in the transmission schedule. The method further includes, in response to determining that at least a portion of the text matches at least a portion of the metadata, storing a data record associated with the transmission schedule. The data record indicates that the audio file is associated with the content item.

In another particular aspect, a computer-readable storage device stores instructions that, when executed by a processor, cause the processor to perform operations including displaying a transmission schedule identifying media items scheduled for transmission. The media items include at least a content item and an audio file of speech content. The operations also include displaying text corresponding to the speech content of the audio file.

In another particular aspect, a system includes a processor and a memory accessible to the processor. The memory stores instructions that, when executed by a processor, cause the processor to perform operations including displaying a transmission schedule identifying media items scheduled for transmission. The media items include at least a content item and an audio file of speech content. The operations also include displaying text corresponding to the speech content of the audio file.

Aspects, advantages, and features of the present disclosure will become apparent after review of the entire application, including the following sections: Brief Description, Detailed Description, and the Claims.

DETAILED DESCRIPTION

The terminology used herein is for the purpose of describing particular aspects only and is not intended to be limiting of the claims. As used herein, the singular forms "a," "an," and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
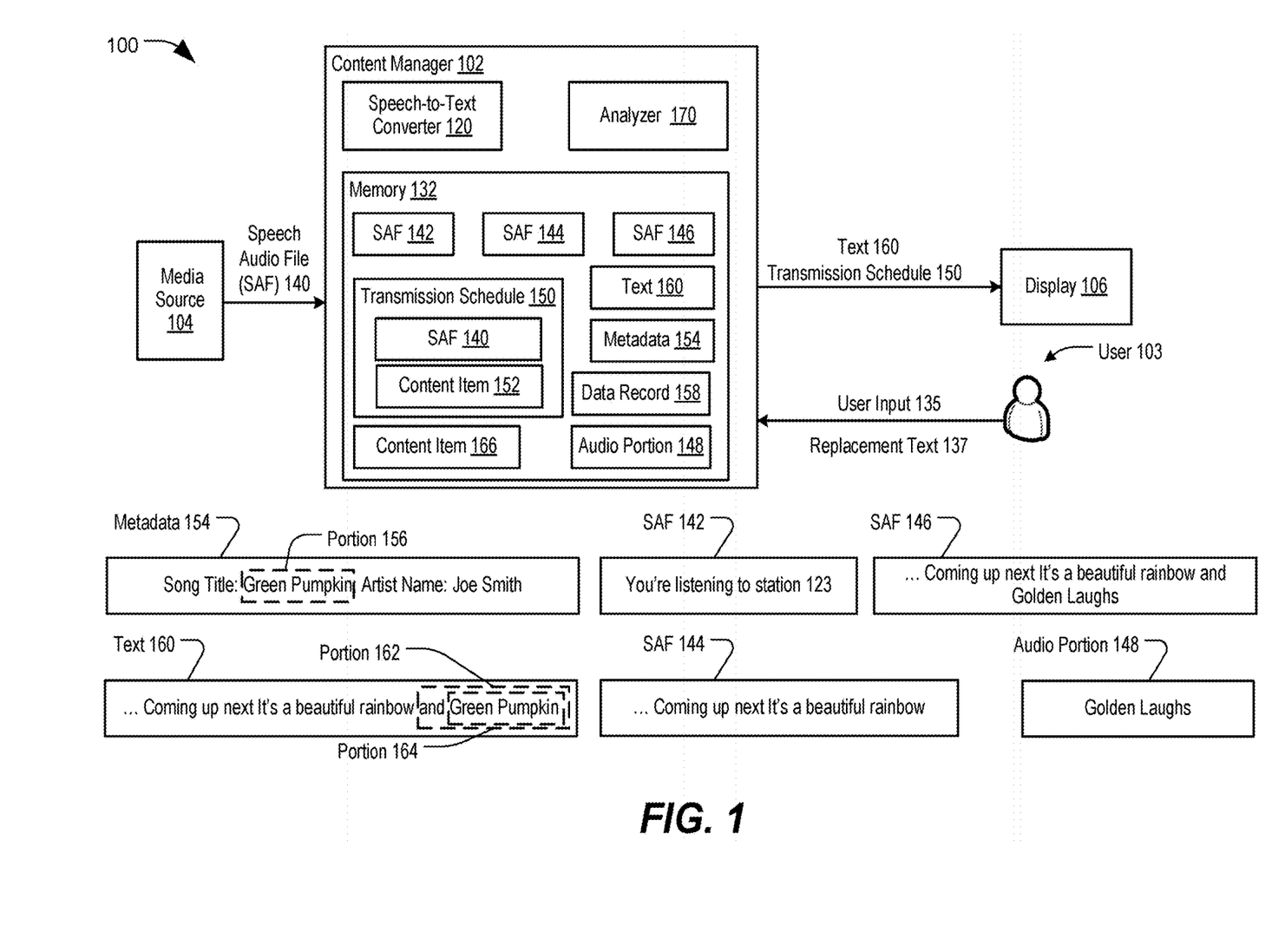
FIG. 1 is a block diagram of a particular illustrative aspect of a system that includes a device that is operable to analyze and display a transmission schedule.

Referring to FIG. 1, a particular illustrative aspect of a system is disclosed and generally designated 100. In a particular aspect, the system 100 includes components and features to control transmission of a media content stream, such as a radio broadcast or an internet radio transmission.

The system 100 includes a content manager 102 (e.g., a computing device configured to execute content management instructions) coupled to a media source 104 and to a display 106. The media source 104 includes one or more computing devices, recording systems, databases, or other audio processing or media storage system configured to provide one or more speech audio files (SAFs) to the content manager 102. A particular SAF may correspond to a voice recording, such as a spoken announcement by a radio host. The content manager 102 may include, or be coupled to, a speech-to-text converter 120. The speech-to-text converter 120 is configured to convert speech content of a particular SAF to text. The content manager 102 includes an analyzer 170 (e.g., a processor). The analyzer 170 is configured to determine whether the speech content of a particular SAF refers to a content item (e.g., a talk show, a music track, or an advertisement), as described further below.

During operation, the content manager 102 generates or displays a transmission schedule 150. For example, the content manager 102 may generate the transmission schedule 150 based on a user input 135 from a user 103 (e.g., an administrator or a radio jockey). The transmission schedule 150 may indicate a playout time (e.g., air time), a play out sequence, or both, associated with one or more content items, one or more SAFs, or a combination thereof. For example, the transmission schedule may include entries corresponding to at least one of a voice announcement, an advertisement, a music program, a talk show, a weather report, a news report, or a station identification spot.

In a particular aspect, the transmission schedule 150 may include a placeholder for a SAF. The transmission schedule 150 may indicate that a content item 152 (e.g., a music track) is subsequent to or prior to the SAF in the play out sequence. In a particular aspect, the transmission schedule 150 indicates that the content item 152 is next to the SAF in the playout sequence. In an alternative aspect, the transmission schedule 150 indicates that there are one or more intervening content items, one or more intervening SAFs, or a combination thereof, between the SAF and the content item 152.

The memory 132 may store metadata 154 of the content item 152. The metadata 154 may include at least one of a song title, an artist name, genre, or an album name. For example, the content item 152 may correspond to a music track, and the metadata 154 may include a title of a song in the music track, a name of a singer or a musician that performed in the music track, a genre of the music track, a name of an album that includes the music track, or a combination thereof.

The media source 104 may provide a SAF 140 to the content manager 102. The SAF 140 may correspond to a voice recording of the user 103 or another user. In some implementations, the speech content of the SAF 140 may be non-scripted speech; thus, the content manager 102 may not have information regarding the content of the SAF. The SAF 140 may refer to the content item 152 (e.g., a song) that is scheduled to be transmitted before or after the SAF 140. For example, an announcer may record speech (e.g., "Coming up next 'It's a beautiful rainbow' and 'Green Pumpkin') in a studio as an introduction to upcoming songs in a transmission schedule 150. The media source 104 may generate the SAF 140 corresponding to the recorded speech. The media source 104 may provide the SAF 140 to the content manager 102. The content manager 102 may update the transmission schedule 150 to indicate the SAF 140. For example, the content manager 102 may replace the placeholder with the SAF 140. To illustrate, the content manager 102 may replace the placeholder with the SAF 140 in response to receiving the user input 135 indicating that the placeholder is to be replaced with the SAF 140 in the transmission schedule 150.

The speech-to-text converter 120 may convert the SAF 140 to text 160 using speech-to-text analysis techniques. For example, the speech-to-text converter 120 may generate the text 160 automatically in response to receiving the SAF 140 from the media source 104, in response to determining that the SAF 140 is added to the transmission schedule 150, in response to receiving the user input 135 indicating that the SAF 140 is to be converted to text, or a combination thereof.

The analyzer 170 may determine that the transmission schedule 150 is updated in response to determining that the SAF 140 is added or removed from the transmission schedule 150, that the content item 152 is added or removed from the transmission schedule 150, or both. The analyzer 170 may analyze the transmission schedule 150 in response to determining that the transmission schedule 150 is updated, in response to receiving the user input 135 indicating that the transmission schedule 150 is to be analyzed, or both. Analyzing the transmission schedule 150 may include selecting one or more content items based on the play out sequence indicated by the transmission schedule 150. For example, the analyzer 170 may select the content item 152 in response to determining that the SAF 140 has a first position in the playout sequence and that a second position of the content item 152 in the play out sequence is within a threshold (e.g., 2) of the first position. The threshold may correspond to a configuration setting, a default value, the user input 135, or a combination thereof.

The analyzer 170 may determine whether at least a portion 162 ("Green Pumpkin") of the text 160 matches at least a portion 156 ("Green Pumpkin") of the metadata 154 of the selected content item 152. The analyzer 170 may, in response to determining that the portion 162 matches the portion 156, generate a data record 158 indicating that the SAF 140 refers to the content item 152. The data record 158 may indicate the first position of the SAF and the second position of the content item 152.

The analyzer 170 may provide the text 160, the transmission schedule 150, or both, to the display 106. For example, the analyzer 170 may generate a graphical user interface (GUI) indicating the text 160, the transmission schedule 150, or both, as further described with reference to FIG. 3. The analyzer 170 may provide the GUI to the display 106. The GUI may include an indication (e.g., an icon, a font, a highlight, a color, text, etc.) that the speech content of the SAF 140 refers to the content item 152, as further described with reference to FIG. 3.

In some circumstances, the user 103 may choose to update the transmission schedule 150. For example, the transmission schedule 150 for a particular day may be generated one or more days in advance of transmission. Subsequent to receiving the SAF 140 from the media source 104, the user 103 may determine that the transmission schedule 150 is to be updated. For example, the user 103 may determine that the particular day has a particular condition that merits changing the transmission schedule 150, such as a prediction of stormy weather, a victory in a sporting event, a celebrity wedding announcement, or another condition. The user 103 may determine that one or more content items are to be replaced in the transmission schedule 150 with one or more replacement content items that are better suited for the particular condition. For example, that user 103 may determine that a content item 166 (e.g., a song titled "Golden Laughs") is to be added to the transmission schedule 150.

The user 103 may determine whether to delete (or replace) the content item 152 from the second position in the transmission schedule 150. For example, the user 103 may select another content item to replace with the content item 166 based on the indication that the content item 152 is referred to by the SAF 140. Alternatively, the user 103 may select the content item 152 for deletion (e.g., replacement) independently of the indicator.

In a particular aspect, the analyzer 170 may automatically select one or more content items for deletion from the transmission schedule 150. For example, the analyzer 170 may select the one or more content items based on updated targeting criteria, the user input 135 indicating that a particular number of content items are to be deleted or replaced, or a combination thereof. In some implementations, in response to input indicating that the transmission schedule 150 is to be changed, the analyzer 170 may generate a display indicating content items that are not associated with SAFs, and which may therefore be readily changed.

In a particular aspect, deletion of the content item 152 from the second position in the transmission schedule 150 may be restricted based on the data record 158. For example, the analyzer 170 may, in response to detecting that the content item 152 is a candidate for deletion from the second position and determining that the data record 158 indicates that the SAF 140 at the first position refers to the content item 152 at the second position, perform one or more operations. For example, the analyzer 170 may generate an alert or prompt indicating that the content item 152 cannot be deleted from the second position without deleting (or updating) the SAF 140. In this example, the analyzer 170 may refrain from deleting the content item 152 from the second position. As another example, the analyzer 170 may delete the content item 152 and may generate an alert or prompt indicating that the SAF 140 at the first position refers to the content item 152 that has been deleted from the second position. The analyzer 170 may add the content item 166 at the second position in the transmission schedule 150 in response to determining that the user input 135 indicates that the content item 152 is to be replaced with the content item 166. In this example, the analyzer 170 may, subsequent to deleting the content item 152 from the second position, delete the data record 158 or update the data record 158 to indicate that the SAF 140 at the first position refers to the content item 152 that has been deleted from the second position.

In a particular aspect, the user 103 may choose to delete the SAF 140 from the first position. The analyzer 170 may, in response to receiving the user input 135 indicating that the SAF 140 is to be deleted, remove the SAF 140 from the first position in the transmission schedule 150, delete the data record 158, or both.

In a particular aspect, the user 103 may choose to replace the SAF 140 with a SAF 142. For example, the SAF 142 may correspond to a voice recording that does not refer to the content item 152. To illustrate, the SAF 142 may correspond to a generic station identifier audio (e.g., "You're listening to station 123"). The analyzer 170 may, in response to receiving the user input 135 indicating the SAF 142, replace the SAF 140 with the SAF 142 at the first position in the transmission schedule 150, delete the data record 158, or both.

In a particular aspect, the user 103 may choose to update the SAF 140. For example, the analyzer 170 may, in response to receiving the user input 135 indicating a selection of a portion 164 of the text 160, determine that the portion 164 (e.g., "and Green Pumpkin") corresponds to a first audio portion of the SAF 140. To illustrate, the speech-to-text converter 120 may generate timing data of the text 160 relative to the SAF 140. The timing data may indicate that the portion 164 corresponds to the first audio portion. The analyzer 170 may generate a SAF 144 (e.g., "Coming up next It's a beautiful rainbow") by deleting the first audio portion (e.g., "and Green Pumpkin") from a copy of the SAF 140. The analyzer 170 may replace the SAF 140 with the SAF 144 in the transmission schedule 150, delete the data record 158, or both. As another example, the analyzer 170 may generate a SAF 146 by replacing a first audio portion of the SAF 140 with a second audio portion. For example, the analyzer 170 may, in response to receiving the user input 135 indicating a selection of the portion 162 of the text 160, determine that the portion 162 (e.g., "Green Pumpkin") corresponds to a particular audio portion of the SAF 140. The analyzer 170 may generate a SAF 146 by replacing the particular audio portion (e.g., "Green Pumpkin") with an audio portion 148 (e.g., "Golden Laughs") in a copy of the SAF 140. In a particular implementation, the audio portion 148 may correspond to previously recorded (or generated) audio that is stored in the memory 132. In this implementation, the analyzer 170 may generate the SAF 146 by replacing the particular audio portion with the audio portion 148 in response to determining that the user input 135 indicates the audio portion 148. In a particular implementation, the user input 135 may indicate replacement text 137 (e.g., "Golden Laughs"). In a particular implementation, the user input 135 may indicate the content item 166 and the analyzer 170 may determine the replacement text 137 based on metadata (e.g., song title) of the content item 166. The analyzer 170 may generate the audio portion 148 by providing the replacement text 137 to a text-to-audio converter. The analyzer 170 may also provide the SAF 140 to the text-to-audio converter, so that the audio portion 148 has similar speech characteristics as the speech content of the SAF 140. In this implementation, the analyzer 170 may generate the audio portion 148 in response to receiving the user input 135 indicating the replacement text 137 or the content item 166. The analyzer 170 may generate the SAF 146 by replacing the particular audio portion with the audio portion 148.

In a particular aspect, the user 103 may choose to delete, replace, or update the SAF 140 independently of whether the SAF 140 refers to the content item 152. For example, the user 103 may determine that the text 160 is inappropriate for various reasons, such as a promotional event is not mentioned, includes a mistake (e.g., a misrepresentation of fact), etc. The user 103 may choose to delete, replace, or update the SAF 140 in response to determining that the text 160 is inappropriate. Analyzing the text 160 may be more convenient and time-efficient for the user 103 as compared to listening to the SAF 140.

In a particular aspect, the analyzer 170 may, subsequent to deleting, replacing, or updating the SAF 140, receive the user input 135 indicating that the content item 152 is to be replaced with the content item 166. The analyzer 170 may, in response to determining that there is no data record indicating that the content item 152 is referred to by an SAF, replace the content item 152 with the content item 166 at the second position in the transmission schedule 150.

The system 100 may thus enable the user 103 to determine that the content item 152 is referred to by the SAF 140 based on the indication in the GUI, alerts generated by the analyzer 170, or a combination thereof. The system 100 may reduce a likelihood of the user 103 inadvertently removing the content item 152 from the second position in the transmission schedule 150 with the SAF 140 referring to the content item 152.

Figure 2:
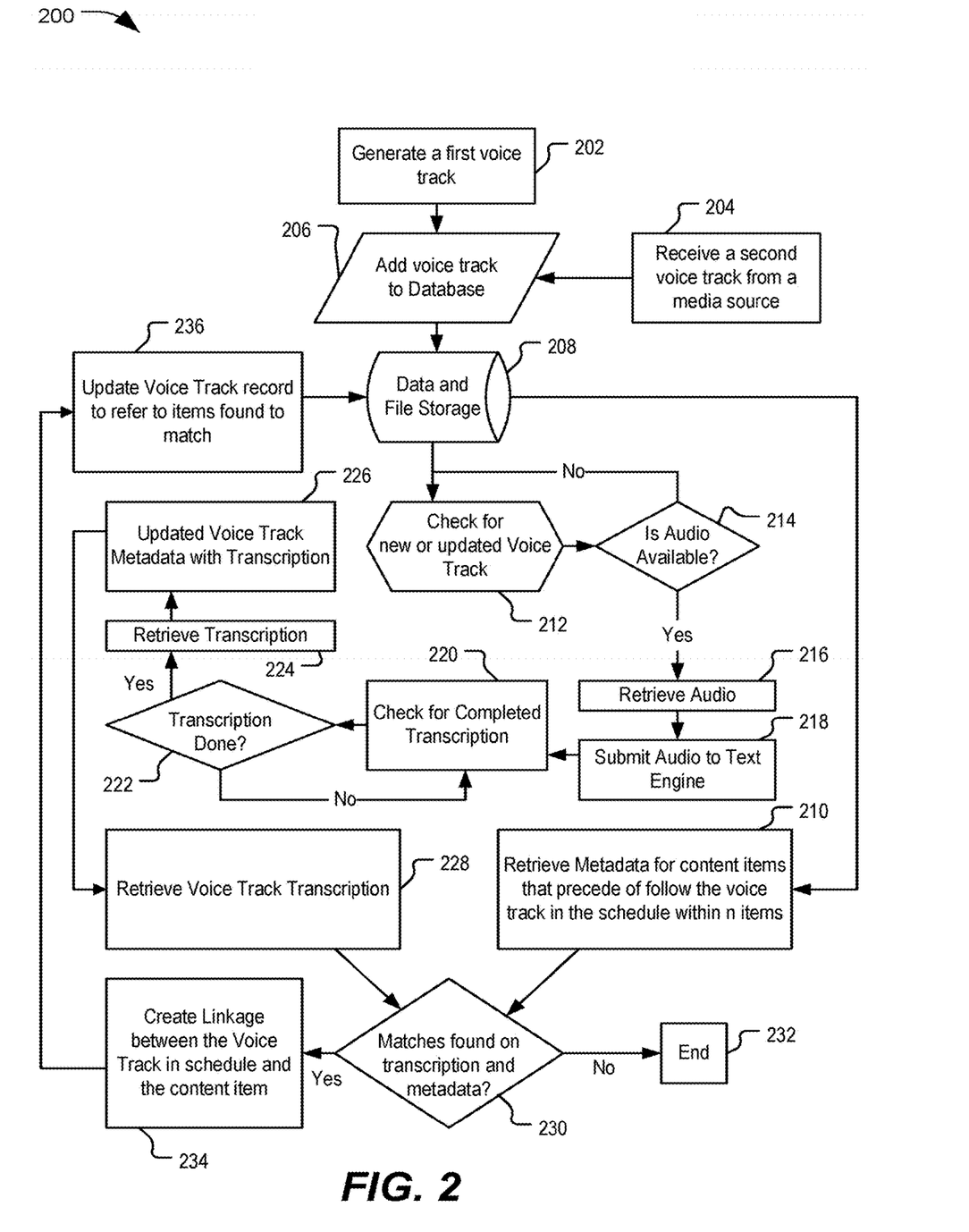
FIG. 2 is a flow chart to illustrate an aspect of a method of analyzing a transmission schedule that may be performed by the system of FIG. 1.

Referring to FIG. 2, a method of analyzing a transmission schedule is shown and generally designated 200. The method 200 may be performed by the analyzer 170, the content manager 102, the system 100 of FIG. 1, or a combination thereof.

The method 200 includes generating a first voice track, at 202. In this context, the voice track may be stored as a SAF, such as the SAF 140 of FIG. 1. For example, the content manager 102 of FIG. 1 may receive an audio signal via a microphone and may generate the SAF 140 corresponding to the audio signal. The method 200 may also include receiving one or more additional voice tracks, such as a second voice track, from a media source, at 204.

The method 200 includes adding the voice track or voice tracks to a database, at 206. For example, the content manager 102 of FIG. 1 may add the first voice track and the second voice track to the memory 132. In this example, the memory 132 corresponds to a database 208.

The method 200 also includes retrieving metadata for one or more items in a transmission schedule, such as contents items in the schedule that precede and follow the voice track within n items, at 210. For example, the analyzer 170 of FIG. 1 may determine that the SAF 140 has a first position in the transmission schedule 150, as further described with reference to FIG. 1. The analyzer 170 may select one or more content items with positions that are within a threshold (e.g., n) number of items from the first position in the transmission schedule 150. For example, the analyzer 170 may select the content item 152, as described with reference to FIG. 1. The analyzer 170 may retrieve metadata of the selected content items. For example, the analyzer 170 may retrieve the metadata 154 of the content item 152.

The method 200 further includes checking for new or updated voice track, at 212. For example, the analyzer 170 of FIG. 1 may determine that the SAF 140 or a placeholder for the SAF 140 has been added to the transmission schedule 150.

The method 200 also includes determining whether audio (of a voice track) is available, at 214. For example, the analyzer 170 of FIG. 1 may determine whether the SAF 140 is available from the memory 132. The method 200 returns to 212 in response to determining that audio is not available, at 214.

The method 200 includes, in response to determining that audio is available, at 214, retrieving the audio, at 216. For example, the analyzer 170 of FIG. 1 may retrieve the SAF 140.

The method 200 further includes submitting audio to text engine, at 218. For example, the analyzer 170 of FIG. 1 may provide the SAF 140 to the speech-to-text converter 120.

The method 200 also includes checking for completed transcription, at 220. For example, the analyzer 170 of FIG. 1 may determine whether the speech-to-text converter 120 has completed analysis of the SAF 140 and whether the text 160 of the SAF 140 is available.

The method 200 further includes determining whether the transcription is done, at 222. For example, the analyzer 170 of FIG. 1 may determine whether the speech-to-text converter 120 has completed analysis of the SAF 140 and whether the text 160 of the SAF 140 is available. The method 200 returns to 220 in response to determining that the transcription is not done, at 222.

The method 200 also includes, in response to determining that the transcription is done, at 222, retrieving the transcription, at 224. For example, the analyzer 170 of FIG. 1 may retrieve the text 160 from the memory 132.

The method 200 further includes updating voice track metadata based on the transcription, at 226. For example, the analyzer 170 of FIG. 1 may add the text 160 to metadata of the SAF 140.

The method 200 also includes retrieving voice track transcription, at 228. For example, the analyzer 170 of FIG. 1 may retrieve the text 160.

The method 200 further includes determining whether the transcription matches the metadata of selected items, at 230. For example, the analyzer 170 of FIG. 1 may determine whether at least a portion of the text 160 matches at least a portion of the metadata 154. The method 200 may, in response to determining that the transcription does not match metadata of any of the selected items, end at 232.

The method 200 includes, in response to determining that a portion of the transcription (e.g., a song identifier mentioned in the speech content of the voice track) matches metadata of one or more of the selected items, at 230, create linkage (e.g., a data record) between the voice track in schedule and the content item, at 234. For example, the analyzer 170 of FIG. 1 may determine that the SAF 140 has a first position in the transmission schedule 150, and that the content item 152 has a second position in the transmission schedule 150. The analyzer 170 may generate the data record 158 (or another data record) indicating that a first schedule event at the first position refers to a second schedule event at the second position. In a particular aspect, the analyzer 170 may generate a GUI including an indication based on determining that the first schedule event (e.g., play out of the voice track) refers to the second schedule event (e.g., play out of the content item), as further described with reference to FIG. 3.

The method 200 also includes updating the voice track record (e.g., the metadata of the voice track) to refer to items found to match (e.g., the content item), at 236. For example, the analyzer 170 of FIG. 1 may update (or generate) the data record 158 to indicate that the SAF 140 refers to one or more content items. A portion of the text 160 may match a portion of metadata of each of the one or more content items. The analyzer 170 may update (or generate) the data record 158 to indicate that the SAF 140 refers to the content item 152. Similarly, the analyzer 170 may, in response to determining that at least a portion of the text 160 matches at least a portion of metadata of a second content item of the selected content items, update the data record 158 (or generate a second data record) to indicate that the SAF 140 refers to the second content item. The analyzer 170 may store the data record 158 (and the second data record) in the database 208 (e.g., the memory 132).

The method 200 may thus enable the content manager 102 to create data records indicating whether the SAF 140 refers to one or more content items in the transmission schedule 150. The data records may also identify positions of the referred content items in the transmission schedule 150. The data records simply management of the transmission schedule by helping users to identify cross-references among items in the transmission schedule.

Figure 3:
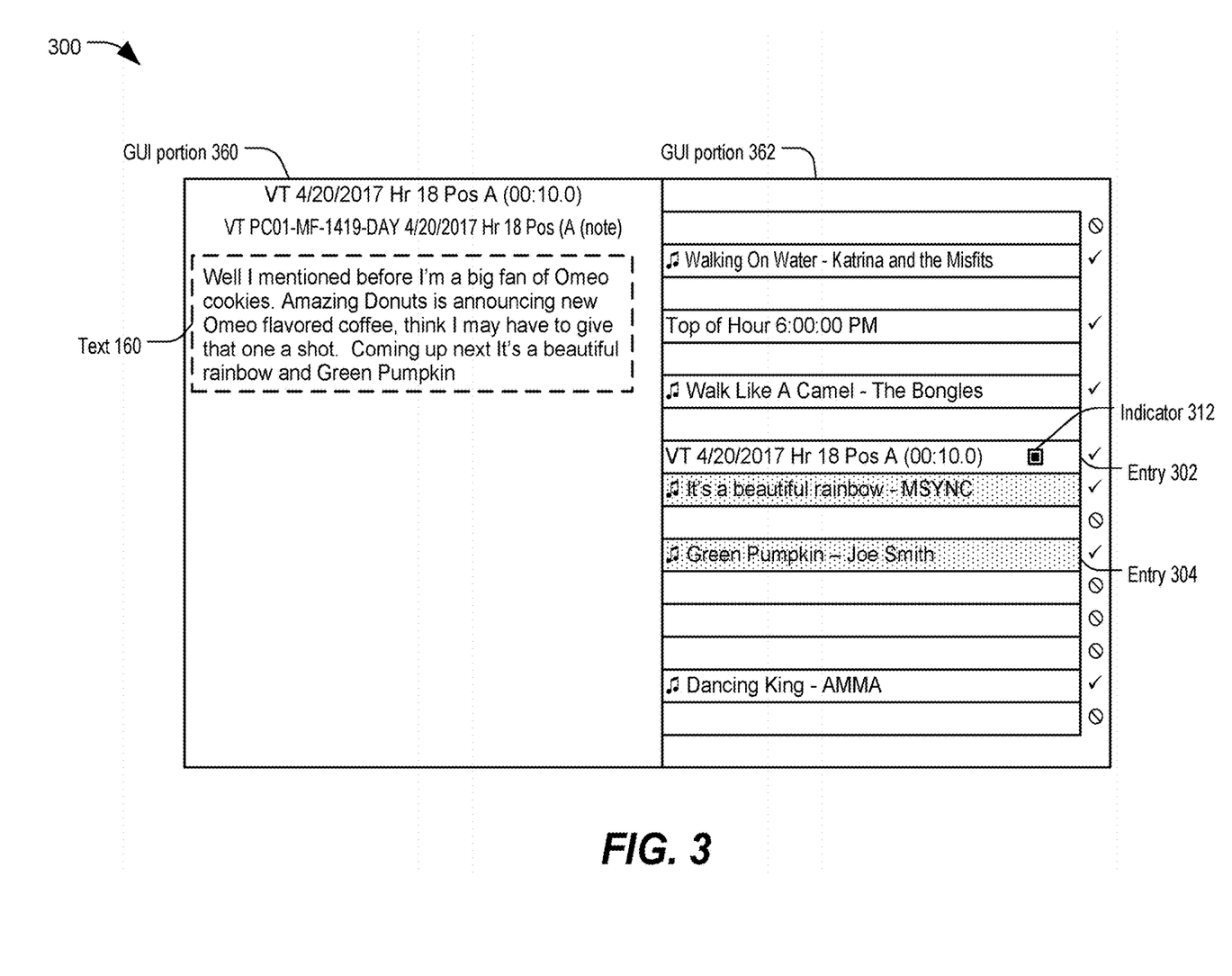
FIG. 3 is a diagram to illustrate an aspect of a graphical user interface generated by the system of FIG. 1.

Referring to FIG. 3, a graphical user interface (GUI) is shown and generally designated 300. The GUI 300 may be generated by the analyzer 170, the content manager 102, the system 100 of FIG. 1, or a combination thereof.

The GUI 300 includes a GUI portion 360 and a GUI portion 362. The GUI portion 360 may include the text 160. The GUI portion 362 may indicate the transmission schedule 150 of FIG. 1. For example, the GUI portion 362 may indicate a play out sequence of one or more content items, one or more SAFs, or a combination thereof. To illustrate, the GUI portion 362 may include an entry 302 corresponding to the SAF 140 and an entry 304 corresponding to the content item 152. A position of the entry 302 may correspond to the first position of the SAF 140 in the transmission schedule 150, and a position of the entry 304 may correspond to the second position of the content item 152 in the transmission schedule 150.

The entry 302 may include an indicator 312 that indicates that the SAF 140 refers to one or more content items of the transmission schedule 150. The indicator 312 may include an icon, a font, a highlight, a fill, text, or another indication. The entry 304 may include an indicator (e.g., a fill, an icon, a font, a highlight, text, or another indication) that indicates that at least one SAF refers to the content item 152. In a particular aspect, the indicator may indicate that selection of the entry 304 for deletion is disabled.

In a particular aspect, the entry 302 may be selectable for deletion. For example, the user 103 of FIG. 1 may delete the entry 302 from the GUI portion 362. The analyzer 170 may remove the SAF 140 from the second position in the transmission schedule 150 in response to receiving the user input 135 indicating that the entry 302 is selected for deletion, as further described with reference to FIG. 1.

In a particular aspect, the text 160 may be editable in the GUI portion 360. For example, the user 103 of FIG. 1 may select and delete a portion of the text 160 in the GUI portion 360. The analyzer 170 may update the SAF 140 in response to receiving the user input 135 indicating that the portion is selected for deletion, as further described with reference to FIG. 1. As another example, the user 103 of FIG. 1 may add the replacement text 137 for a selected portion of the text 160 in the GUI portion 360. The analyzer 170 may update the SAF 140 in response to receiving the user input 135 indicating the replacement text 137, as further described with reference to FIG. 1.

In a particular aspect, the GUI portion 360 is displayed concurrently with the GUI portion 362. For example, the GUI portion 360 may be displayed at least partially overlapping or non-overlapping the GUI portion 362. In an alternative aspect, one of the GUI portion 360 or the GUI portion 362 may be displayed at a time.

The GUI 300 may enable the user 103 of FIG. 1 to analyze the text 160 independently of listening to the SAF 140. The user 103 may update the SAF 140 by editing the text 160 in the GUI 300. The user 103 may determine that the SAF 140 refers to at least one content item based on the presence of the indicator 312. The user 103 may identify content items that are referred to by at least one SAF.

Figure 4:
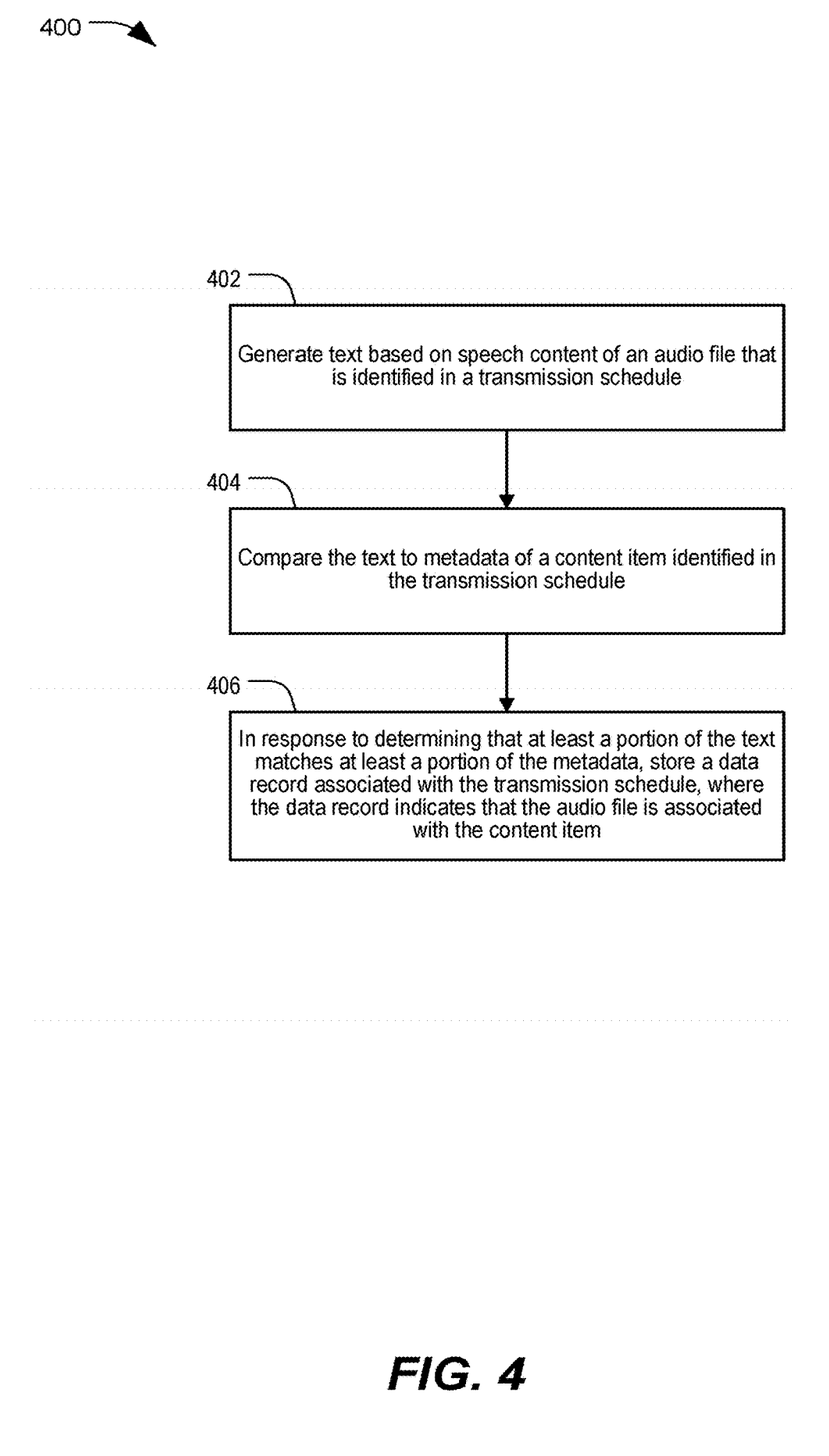
FIG. 4 is a flowchart to illustrate an aspect of a method of analyzing a transmission schedule that may be performed by the system of FIG. 1.

Referring to FIG. 4, a method of analyzing a transmission schedule is shown and generally designated 400. The method 400 may be performed by the analyzer 170, the speech-to-text converter 120, the content manager 102, the system 100 of FIG. 1, or a combination thereof.

The method 400 includes generating text based on speech content of an audio file that is identified in a transmission schedule, at 402. For example, the speech-to-text converter 120 of FIG. 1 may generate the text 160 based on the SAF 140 that is indicated in the transmission schedule 150.

The method 400 also includes comparing the text to metadata of a content item identified in the transmission schedule, at 404. For example, the analyzer 170 of FIG. 1 may compare the text 160 to the metadata 154 of the content item 152 identified in the transmission schedule 150.

The method 400 further includes, in response to determining that at least a portion of the text matches at least a portion of the metadata, storing a data record associated with the transmission schedule, at 406. For example, the analyzer 170 of FIG. 1 may, in response to determining that at least the portion 162 of the text 160 matches at least the portion 156 of the metadata 154, store the data record 158 associated with the transmission schedule 150. The data record 158 may indicate that the SAF 140 is associated with the content item 152.

The method 400 thus enables automatic analysis of and annotation of a transmission schedule 150 by generating the data record 158. The data record 158 may reduce a likelihood of the content item 152 being inadvertently deleted when the SAF 140 refers to speech content of the content item 152. For example, the SAF 140 may include speech identifying the next song in the transmission schedule 150 as the content item 152 (e.g., "Green Pumpkin"). However, after the SAF 140 has been recorded and added to the transmission schedule 150, if a change to the transmission schedule 150 causes the deletion of or a change of position of the content item 152 in the transmission schedule 150, listeners may be confused since the reference in the SAF 140 to the content item 152 would not be correct. The method 400 facilitates detection and correction of potentially misleading cross-references between content items in the transmission schedule. Further, the method 400 may be used to prohibit (or inhibit) some changes to the transmission schedule that could lead to confusion. To illustrate, the method 400 may include inhibiting deletion of the content item 152 from the transmission schedule 150 unless the SAF 140 is also deleted or modified.

Figure 5:
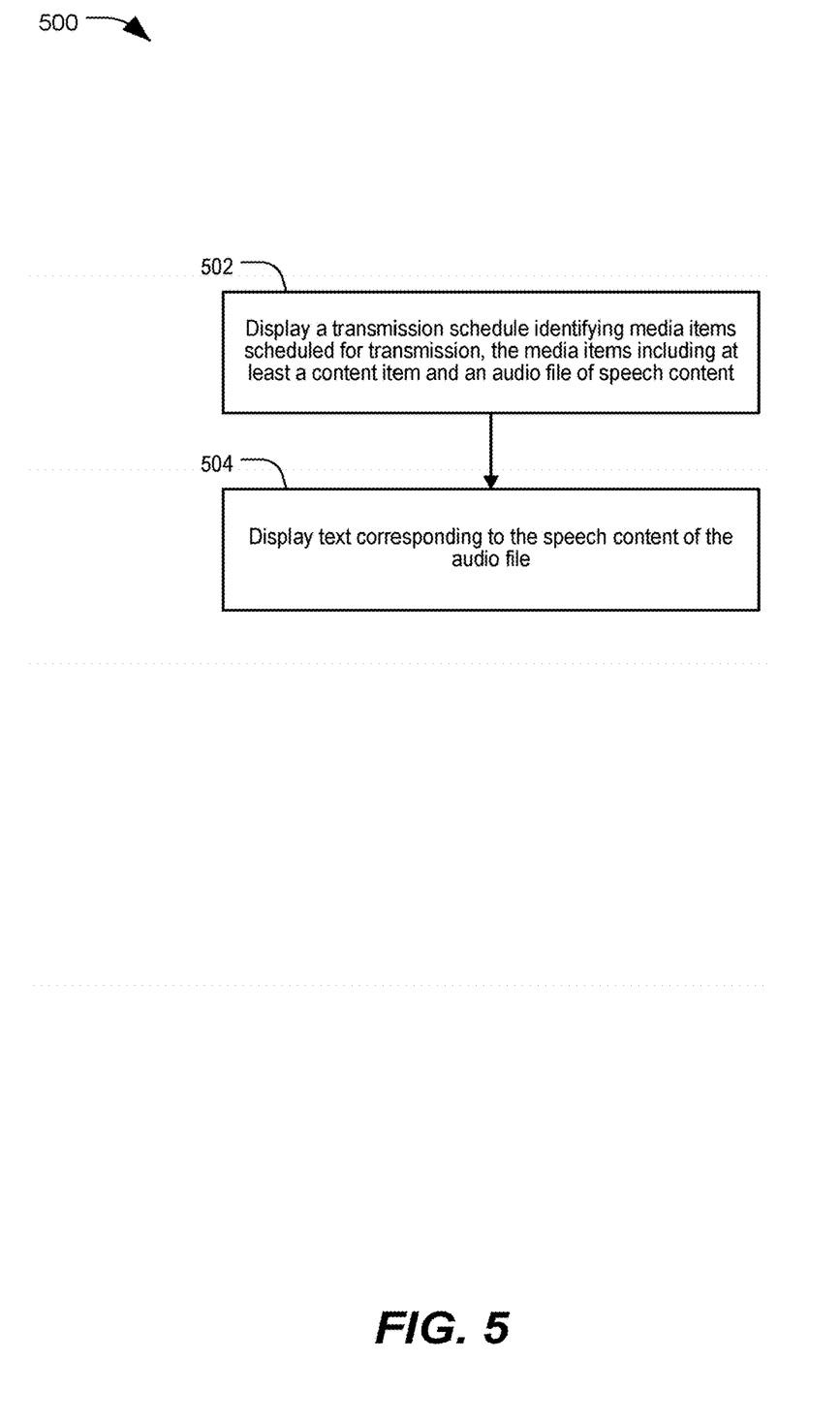
FIG. 5 is a flow chart to illustrate an aspect of a method of displaying a transmission schedule that may be performed by the system of FIG. 1.

Referring to FIG. 5, a method of displaying a transmission schedule is shown and generally designated 500. The method 500 may be performed by the analyzer 170, the content manager 102, the system 100 of FIG. 1, or a combination thereof.

The method 500 includes displaying a transmission schedule identifying media items scheduled for transmission, at 502. For example, the analyzer 170 of FIG. 1 may provide the transmission schedule 150 to the display 106. To illustrate, the analyzer 170 may provide the GUI 300 to the display 106. The GUI 300 may include the GUI portion 362 indicating the transmission schedule 150. The transmission schedule 150 may identify media items scheduled for transmission. The media items may include at least one content item and an audio file of speech content. For example, the media items may include at least the content item 152 and the SAF 140.

The method 500 also includes displaying text corresponding to the speech content of the audio file, at 504. For example, the analyzer 170 of FIG. 1 may provide the text 160 to the display 106. To illustrate, the analyzer 170 may provide the GUI 300 to the display 106. The GUI portion 360 of the GUI 300 may include the text 160.

The method 500 thus enables analysis of the text 160 independently of listening to the SAF 140. Analysis of the text 160 may be faster and more convenient for the user 103 of FIG. 1 as compared to listening to the SAF 140. For example, the text may be used to audit content of the audio file without listening to the audio file. Skimming the text content may be faster than listening to the audio file. Thus, for example, a station manager may be able to review non-scripted speech of one or more radio personalities for inappropriate or incorrect comments, compliance with station policies (e.g., to determine whether particular events are being mentioned periodically), etc. without listening to every comment made by the one or more radio personalities.

Figure 6:
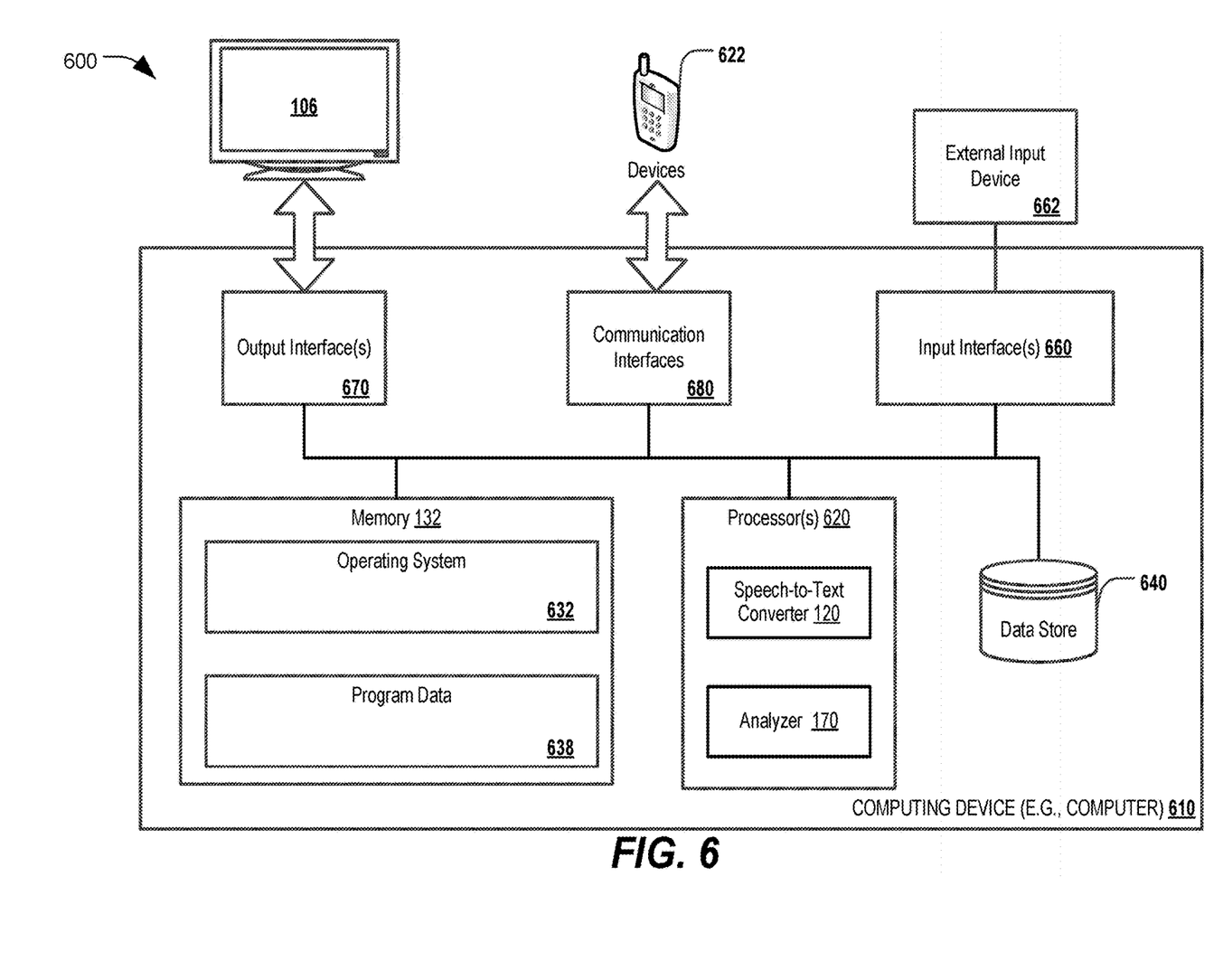
FIG. 6 is a block diagram of a device operable to perform transmission schedule analysis and/or display in accordance with the systems, devices, and methods of FIGS. 1-5.

FIG. 6 is a block diagram of a computing environment 600 including a computing device 610 that is operable to support aspects of computer-implemented methods, computer program products, and system components according to the present disclosure.

The computing device 610 includes at least one processor 620 and the memory 132 (e.g., a system memory). For example, the computing device 610 may be a desktop computer, a laptop computer, a tablet computer, a server, a cloud computing device, or any other fixed or mobile computing device. The at least one processor 620 may include the speech-to-text converter 120, the analyzer 170, or both. Depending on the configuration and type of computing device, the memory 132 may include volatile (such as random access memory or "RAM"), non-volatile (such as read-only memory or "ROM," flash memory, and similar memory devices that maintain stored data even when power is not provided), a combination thereof, or some other memory. The memory 132 may store an operating system 632, program data 638, or both. The program data 638 may include SAF 142, the SAF 144, the SAF 146, the transmission schedule 150, the text 160, the metadata 154, the data record 158, the audio portion 148, the content item 166 of FIG. 1, or a combination thereof. In an illustrative aspect, the computing device 610 may correspond to the content manager 102 of FIG. 1.

The computing device 610 may also have additional features or functionality. For example, the computing device 610 may also include removable and/or nonremovable additional data storage devices, such as magnetic disks, optical disks, tape, and memory cards. Such additional storage is illustrated in FIG. 6 by a data store 640. In a particular aspect, at least a portion of the program data 638 is stored at the data store 640. Computer-readable or processor-readable storage media may include volatile and/or non-volatile storage and removable and/or non-removable media implemented in any technology for storage of information such as computer-readable instructions, data structures, program components or other data. The memory 132 and the data store 640 are examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, and other non-transitory media that can be used to store information and that can be accessed by the computing device 610. Any such computer storage media may be part of the computing device 610.

The computing device 610 may also have one or more input devices, such as an external device 662 connected via one or more input interfaces 660. One or more output devices, such as the display 106, speakers, a printer, etc. may also be connected to the computing device 610 via one or more output interfaces 670. The input interfaces 660 and the output interfaces 670 may each include one or more wired or wireless interfaces, such as a universal serial bus (USB) interface, a video graphics array (VGA) interface, a serial interface, a digital visual interface (DVI), a high-definition multimedia interface (HDMI), or some other interface. In certain aspects, such as when the computing device 610 is a server, the input interfaces 660 and the output interfaces 670 may not be included. The computing device 610 has one or more communication interfaces 680 that enable the computing device 610 to communicate (e.g., via a network) with other computing devices 622, such as media source 104 of FIG. 1, or a combination thereof.

Particular aspects of disclosed techniques may be implemented in conjunction with a client-server architecture. To illustrate, the computing device 610 may be an application server or other server that provides transmission schedule management.

It will be appreciated that not all of the components or devices illustrated in FIG. 6 or otherwise described in the previous paragraphs are necessary to support aspects as herein described. It will also be appreciated that the computing device 610 may have additional or different components or devices than illustrated in FIG. 6 or otherwise described in the previous paragraphs.

Although the exemplary aspects described herein are intended to enable a person skilled in the art to practice such aspects, it should be understood that other aspects may be realized, and that logical and physical changes may be made without departing from the scope of the present disclosure. Thus, the detailed description herein is presented for purposes of illustration only.

In one aspect, portions of the present disclosure may be implemented using a system that includes a software module, logic engines, computer hardware, databases, and/or computer networks. Moreover, while the description may make reference to specific technologies, system architectures, and data management techniques, it will be appreciated that other devices and/or methods that use different technologies, architectures, or techniques may be implemented without departing from the scope of the disclosure. This disclosure is intended to cover any and all subsequent adaptations or variations of various aspects.

As will be appreciated by one skilled in the art, some aspects may be embodied as a system, method, or computer program product. Accordingly, some aspect may take the form of an entirely hardware implementation, an entirely software implementation (including firmware, resident software, micro-code, etc.) or a combination of software and hardware aspects that may all generally be referred to herein as a "circuit," "module," or system" Furthermore, some aspects may take the form of a computer program product embodied in a tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus device, or propagation medium More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured via, for instance, optic al scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, radio frequency (RF), etc. Computer program code for carrying out operations of the disclosure may be written in any combination of one or more programming languages, including an object oriented programming language, such as Java, Smalltalk, C++, or the like, and conventional procedural programming languages, such as the "C" programming language, or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Various aspects are described with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create mans for implementing the functions/acts specified in the flowchart and/or block diagram block or blocks. The computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in FIGS. 1-6 illustrate the architecture, functionality, and operation of possible implementations of systems, methods, and computer program products according to various disclosed aspects. In this regard, each block in the flowchart or block diagrams may represent a module, a segment, or a portion of code, which includes one or more executable instructions for implementing the specified logical function(s). It should also be noted that, in some alternative implementations, the functions noted in the block may occur out of order noted in the FIGS. 1-6. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the form disclosed. Many modifications and variations will be apparent to those of ordinary skill in the art without departing from the scope and spirit of this technology. Some implementations were chosen and described in order to explain the principles and practical application, and to enable others of ordinary skill in the art to understand various implementations with various modifications as are suited to particular uses contemplated.

The Abstract is not intended to be used in interpreting or limiting the scope or meaning of the claims. In addition, the disclosure is not to be interpreted as indicating that the claimed aspects require more features than are expressly recited in each claim Thus, the present disclosure is not intended to be limited to the aspects shown herein but is to be accorded the widest scope possible consistent with the principles and novel features as defined by the following claims.

What is claimed is:

1. A method comprising:
obtaining a first speech audio file scheduled for transmission in a first position of a transmission schedule;
obtaining a first transcript of the first speech audio file;
obtaining first metadata associated with a first content item scheduled for transmission in a second position of the transmission schedule;
comparing the first metadata to at least a portion of the first transcript to determine whether any of the first metadata matches the at least a portion of the first transcript;
in response to determining that at least a portion of the first metadata matches at least a portion of the first transcript creating a linkage between the first speech audio file and the first content item; and
generating a graphical user interface (GUI) displaying a list of items scheduled for transmission including:
a first identifier representing the first speech audio file in the first position; and
a second identifier representing the first content item in the second position.

2. The method of claim 1, wherein obtaining the first transcript includes:
receiving the first speech audio file from an external media source; and
performing a speech-to-text conversion on the first speech audio file.

3. The method of claim 1, wherein the first metadata includes:
at least one of a song title, an artist name, a genre, or an album name.

4. The method of claim 3, wherein comparing the first metadata to at least a portion of the first transcript includes:

determining whether text included in the first transcript matches any of the song title, the artist name, the genre, or the album name included in the first metadata.

5. The method of claim 1, wherein generating the GUI further includes:
configuring the GUI to display a transcript of the first speech audio file.

6. The method of claim 5, further comprising:
receiving user input, via the GUI, indicating that the first speech audio file is to be deleted.

7. The method of claim 5, further comprising:
receiving user input, via the GUI, indicating alterations to the transcript of the first speech audio file; and
updating the first speech audio file based on the user input.

8. A processing system comprising:
at least one processor;
memory coupled to the at least one processor, the memory configured to store metadata associated with content items;
at least one communications interface coupled to the at least one processor and the memory, wherein the at least one communications interface is configured to receive a first speech audio file scheduled for transmission in a first position of a transmission schedule;
the at least one processor configured to:
obtain a first transcript of the first speech audio file;
obtain, from the memory, first metadata associated with a first content item scheduled for transmission in a second position of the transmission schedule;
compare the first metadata to at least a portion of the first transcript to determine whether any of the first metadata matches the at least a portion of the first transcript;
in response to determining that at least a portion of the first metadata matches at least a portion of the first transcript, creating a linkage between the first speech audio file and the first content item; and
generating a graphical user interface (GUI) displaying a list of items scheduled for transmission including:
a first identifier representing the first speech audio file in the first position; and
a second identifier representing the first content item in the second position.

9. The processing system of claim 8, wherein the at least one processor is configured to obtain the first transcript by:
receiving the first speech audio file from an external media source; and
performing a speech-to-text conversion on the first speech audio file.

10. The processing system of claim 8, wherein the first metadata includes:
at least one of a song title, an artist name, a genre, or an album name.

11. The processing system of claim 10, wherein the at least one processor is further configured to:
determine whether text included in the first transcript matches any of the song title, the artist name, the genre, or the album name included in the first metadata.

12. The processing system of claim 8, wherein the at least one processor is further configured to:
configure the GUI to display a transcript of the first speech audio file.

13. The processing system of claim 12, the at least one processor is further configured to:

receive user input, via the GUI, indicating that the first speech audio file is to be deleted.

14. The processing system of claim 12, the at least one processor is further configured to:
receive user input, via the GUI, indicating alterations to the transcript of the first speech audio file; and
update the first speech audio file based on the user input.

15. A non-transitory computer readable medium tangibly embodying a program of instructions to be stored in a memory and executed by a processor, the program of instructions comprising:
at least on instruction to obtain a first speech audio file scheduled for transmission in a first position of a transmission schedule;
at least on instruction to obtain a first transcript of the first speech audio file;
at least on instruction to obtain first metadata associated with a first content item scheduled for transmission in a second position of the transmission schedule;
at least on instruction to compare the first metadata to at least a portion of the first transcript to determine whether any of the first metadata matches the at least a portion of the first transcript;
at least on instruction to create a linkage between the first speech audio file and the first content item in response to determining that at least a portion of the first metadata matches at least a portion of the first transcript; and
at least on instruction to generate a graphical user interface (GUI) displaying a list of items scheduled for transmission including:
a first identifier representing the first speech audio file in the first position; and
a second identifier representing the first content item in the second position.

16. The non-transitory computer readable medium of claim 15, wherein the at least one instruction to obtain the first transcript includes:
receiving the first speech audio file from an external media source; and
performing a speech-to-text conversion on the first speech audio file.

17. The non-transitory computer readable medium of claim 15, wherein the first metadata includes:
at least one of a song title, an artist name, a genre, or an album name.

18. The non-transitory computer readable medium of claim 17, wherein the at least one instruction to compare the first metadata to at least a portion of the first transcript includes:
at least one instruction to determine whether text included in the first transcript matches any of the song title, the artist name, the genre, or the album name included in the first metadata.

19. The non-transitory computer readable medium of claim 15, wherein the at least one instruction to generate the GUI further includes:
at least one instruction to configure the GUI to display a transcript of the first speech audio file.

20. The non-transitory computer readable medium of claim 19, wherein the program of instructions further includes:
at least one instruction to receive user input, via the GUI, indicating that the first speech audio file is to be deleted.

* * * * *